(12) United States Patent
Gill (10) Patent No.: US 6,943,997 B2
(45) Date of Patent: Sep. 13, 2005

(54) SENSOR WITH IMPROVED STABILIZATION AND TRACK DEFINITION

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 129 days.

(21) Appl. No.: 10/659,541

(22) Filed: Sep. 9, 2003

(65) Prior Publication Data

US 2005/0052792 A1 Mar. 10, 2005

(51) Int. Cl.[7] .............................. G11B 5/127; G11B 5/39
(52) U.S. Cl. ................................................. 360/324.12
(58) Field of Search ...................... 360/324.12, 324.2, 360/324.1, 324, 313, 110

(56) References Cited

U.S. PATENT DOCUMENTS

| 5,930,087 | A | * | 7/1999 | Brug et al. ............... 360/324.2 |
| 6,469,878 | B1 | | 10/2002 | Mack et al. ............ 360/324.12 |
| 6,556,392 | B1 | | 4/2003 | Mao et al. ............. 360/324.12 |
| 2001/0004307 | A1 | * | 6/2001 | Saito et al. ............ 360/324.12 |
| 2002/0131218 | A1 | | 9/2002 | Beach .................... 360/324.12 |
| 2002/0131219 | A1 | | 9/2002 | Mack et al. ........... 360/324.12 |
| 2002/0135948 | A1 | | 9/2002 | Funayama et al. ....... 360/324.1 |
| 2003/0011364 | A1 | | 1/2003 | Hosomi et al. ............. 324/252 |
| 2003/0062981 | A1 | | 4/2003 | Hosomi et al. ............. 336/200 |
| 2003/0096057 | A1 | | 5/2003 | Horng et al. ................ 427/127 |
| 2003/0146086 | A1 | | 8/2003 | Makino ................. 204/192.15 |

OTHER PUBLICATIONS

IBM TDB, "Self–Pinned Tunnel Valve Head", Dec. 1, 2001, no. 452, p. 2106.*

* cited by examiner

Primary Examiner—Julie Anne Watko
(74) Attorney, Agent, or Firm—Zilka-Kotab, PC (57) ABSTRACT

A magnetic head having a free layer structure having at least three layers. First and second free layers have magnetic moments that are pinned antiparallel each other. A third free layer, closer to the second free layer than the first free layer, has a magnetic moment oriented parallel to the magnetic moment of the second free layer. Ends of the third free layer define track edges of the third free layer. The first and second free layers extend beyond the track edges in a direction parallel to the ABS.

22 Claims, 9 Drawing Sheets

SENSOR WITH IMPROVED STABILIZATION AND TRACK DEFINITION

FIELD OF THE INVENTION

The present invention relates to magnetic heads, and more particularly, this invention relates to read heads having magnetically pinned free layers in a free layer structure.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

Figure 1A:
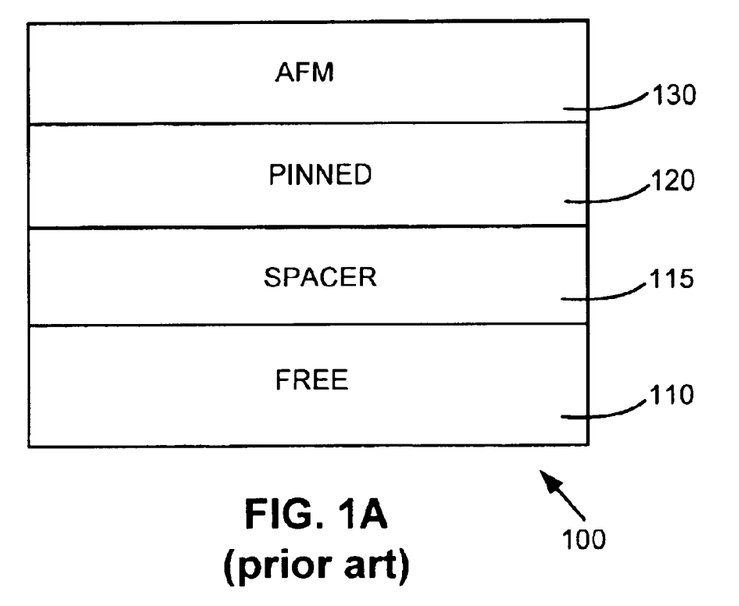
FIG. 1A is an air bearing surface view, not to scale, of a prior art spin valve (SV) sensor.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

Figure 1B:
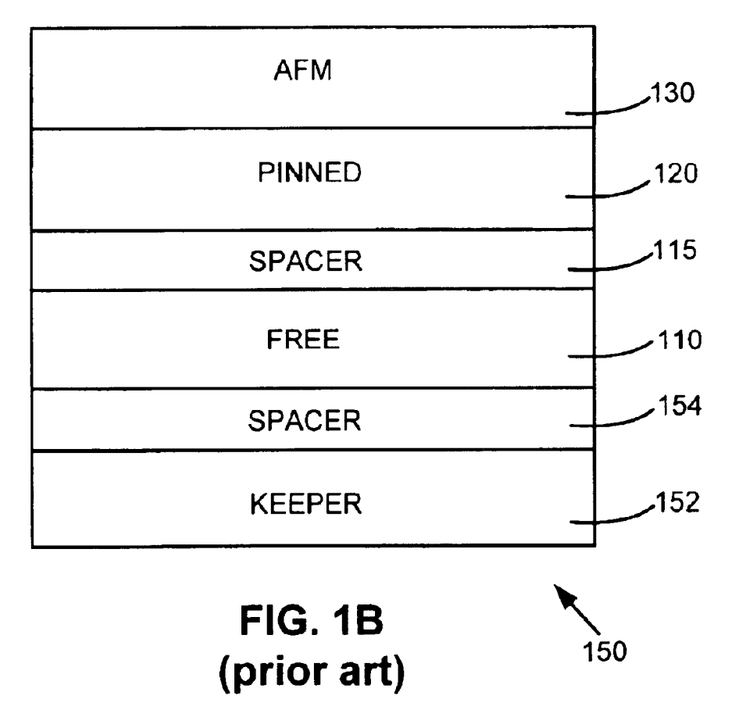
FIG. 1B is an air bearing surface view, not to scale, of a prior art keepered SV sensor.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Figure 2A:
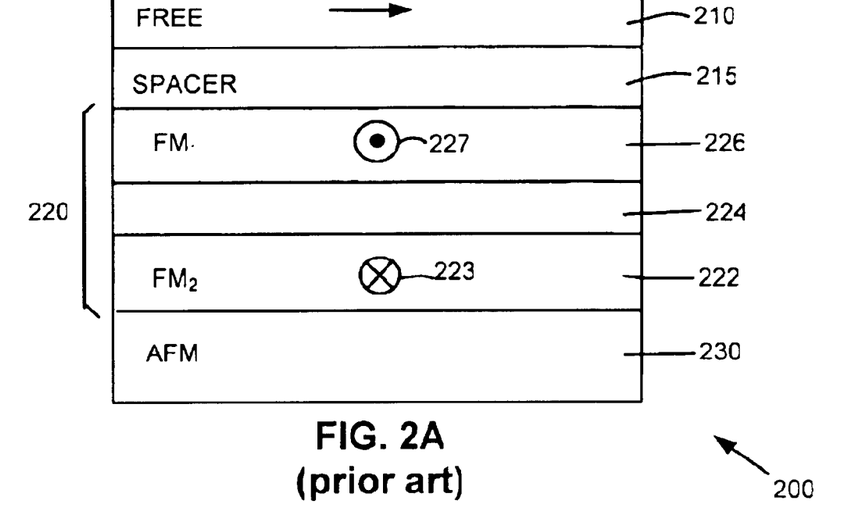
FIG. 2A is an air bearing surface view, not to scale, of a prior art AP-Pinned SV sensor.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Figure 2B:
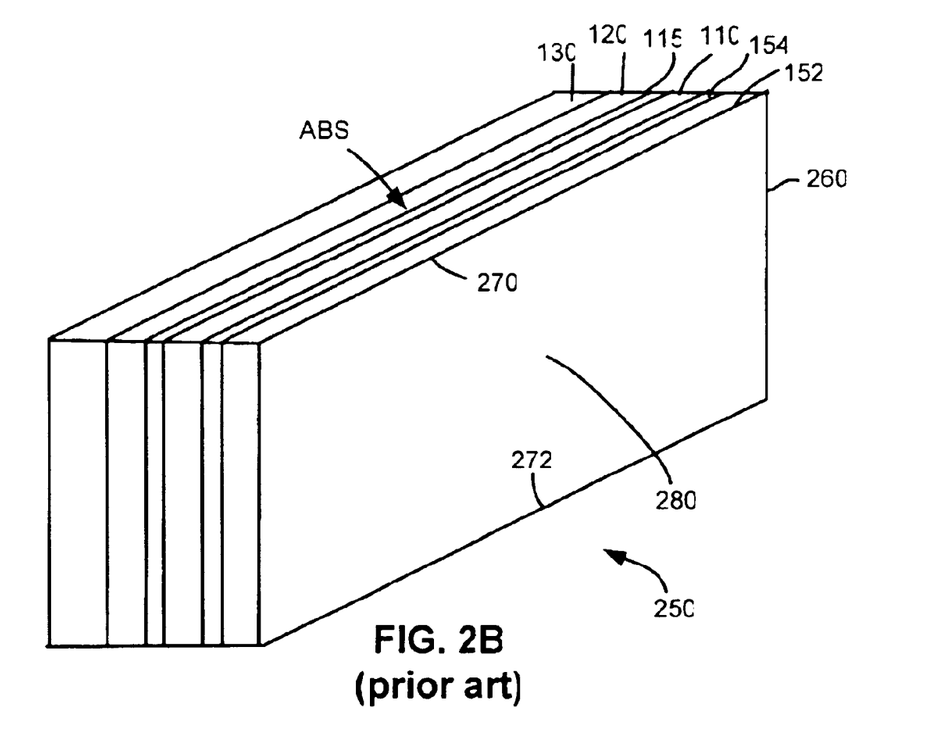
FIG. 2B is a perspective view, not to scale, of a prior art AP-Pinned SV sensor.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

Furthermore, prior art AP-Pinned SV sensors use an AFM in order to pin the pinned layer magnetization. Most commonly used AFM materials have blocking temperatures (temperature at which the pinning field reaches zero Oe) near 200° C. This means that if the temperature of the SV sensor approaches this temperature, the pinned layer magnetization can change its orientation resulting in degraded SV sensor performance.

Although AP-Pinned SV sensors have large effective pinning fields because near cancellation of the magnetic moments of the two sub-layers results in a low net magnetic moment for the pinned layer, thermal stability is still a concern because the operating temperatures of these SV sensors in disk files can exceed 120° C. In addition, the AP-pinned layer structure is vulnerable to demagnetization during processing operations such as lapping.

Therefore there is a need for an SV sensor that increases the magnetic saturation of the pinned layer and reduces the sensitivity to demagnetizing fields particularly at the front and rear edges of the pinned layer stripe. In SV sensors that include AFM layers to provide exchange anisotropy fields to fix the pinned layer magnetization direction, there is a further need for an SV structure that reduces the temperature limitations imposed by the blocking temperature characteristics of the commonly used antiferromagnetic materials required in prior art SV sensors for providing pinning fields.

In any of the prior art sensors described above, the thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

The transfer curve of a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as:

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

Another factor that can affect readback asymmetry is positive magnetostriction of the free layer structure. If the free layer structure has positive magnetostriction and is subjected to compressive stress, there will be a stress-induced anisotropy that urges the magnetic moment of the free layer from the aforementioned position parallel to the ABS toward a position perpendicular to the ABS. The result is readback asymmetry. The compressive stress occurs after the magnetic head is lapped at the ABS to form the stripe height of the sensor of the read head. After lapping, the free layer is in compression and this, in combination with positive magnetostriction, causes the aforementioned readback asymmetry. It is interesting to note that if the free layer structure has negative magnetostriction in combination with compressive stress that the magnetic moment of the free layer is strengthened along the position parallel to the ABS. A high negative magnetostriction, however, is not desirable because it makes the magnetic moment of the free layer structure stiff and less responsive to field signals from the rotating magnetic disk. Accordingly, it is desirable that the magnetostriction of the free layer be zero or only slightly negative.

Unfortunately, magnetostriction of the free layer is difficult to control in present sputtering deposition systems. A typical free layer structure includes first and second free layers wherein the first free layer is cobalt iron and the second free layer is nickel iron with the first free layer interfacing the copper spacer layer for increasing the magnetoresistive coefficient dr/R of the sensor. Typical compositions of the free layers are cobalt iron ($Co_{90}Fe_{10}$) for the first free layer and nickel iron ($Ni_{83}Fe_{17}$) for the second free layer. When these layers are formed by sputter deposition the free layer structure invariably has an undesirable positive magnetostriction. In the past, the positive magnetostriction of the free layers has been accomplished by changing the composition of the free layers, such as reducing the iron content in the nickel iron and/or reducing the iron content in the cobalt iron. Since there is typically more than one nickel iron and cobalt iron layer in the spin valve sensor, this means that the targets in the sensor have to be changed in order to change the composition and lower the magnetostriction of the free layer structure.

Another problem found with sensors is that when the sensor has a very narrow track width, AP layers become unstable. More particularly, the AP layers tend to become unpinned because the pinning strength becomes weaker as the width of the layers is decreased. What is needed is a way to stabilize pinned layers in a narrow track width sensor so that magnetic orientations of the pinned layers do not flip under electrical or mechanical stress. What is also needed is a way to improve track definition by reducing magnetic interference caused by side reading.

SUMMARY OF THE INVENTION

The present invention overcomes the drawbacks and limitations described above by providing a magnetic head having an air bearing surface (ABS). The head includes a free layer structure having at least three layers. First and second free layers have magnetic moments that are pinned antiparallel each other. A third free layer, closer to the second free layer than the first free layer, has a magnetic moment oriented parallel to the magnetic moment of the second free layer. Ends of the third free layer define track edges of the third free layer. The first and second free layers extend beyond the track edges in a direction parallel to the ABS. The first and second free layers have near identical magnetic thicknesses and therefore the areas of the free layer outside the track edges (track edges defined by the edges of the third free layer) do not generate any signal and also provide magnetic stability to the free layer. The third free layer is exchange coupled with the second free layer, and is thereby stabilized by the second free layer.

Preferably, a net magnetic moment of the first and second free layers is negligible. Also preferably, the first and second free layers extend beyond the track edges for distances each at least as long as a length of the third free layer measured between its track edges. More preferably, the first and second free layers extend beyond the track edges for distances each at least five times as long as a length of the third free layer.

In one embodiment, a thickness of the first free layer is less than a combined thickness of the second and third free layers, the thicknesses being measured in a direction perpendicular to a plane of the first free layer. Preferably, a thickness of the third free layer is greater than thicknesses of the first and second free layers individually, the thicknesses being measured in a direction perpendicular to a plane of the first free layer.

To further enhance the pinning of the portions of the first and second free layers, at least one antiferromagnetic (AFM) layer can be positioned outside the track edges of the third free layer in a direction parallel to the ABS, each AFM layer being for pinning a magnetic orientation of portions of the free layer closest thereto that are positioned outside the track edges of the third layer.

The head preferably further includes an antiparallel (AP) pinned layer structure that has at least two pinned layers having magnetic moments that are self-pinned antiparallel to each other. The AP pinned layer structure further stabilizes the free layer structure.

The head may also include a shield layer positioned above the free layer structure. To further reduce the effects of side reading from adjacent tracks, portions of the shield layer positioned outside the track edges can be made to extend downwardly towards the portions of the free layer structure positioned outside the track edges.

The head described herein may form part of a GMR head, a CPP GMR sensor, a CIP GMR sensor, a CPP tunnel valve sensor, etc. for use in a magnetic storage system.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
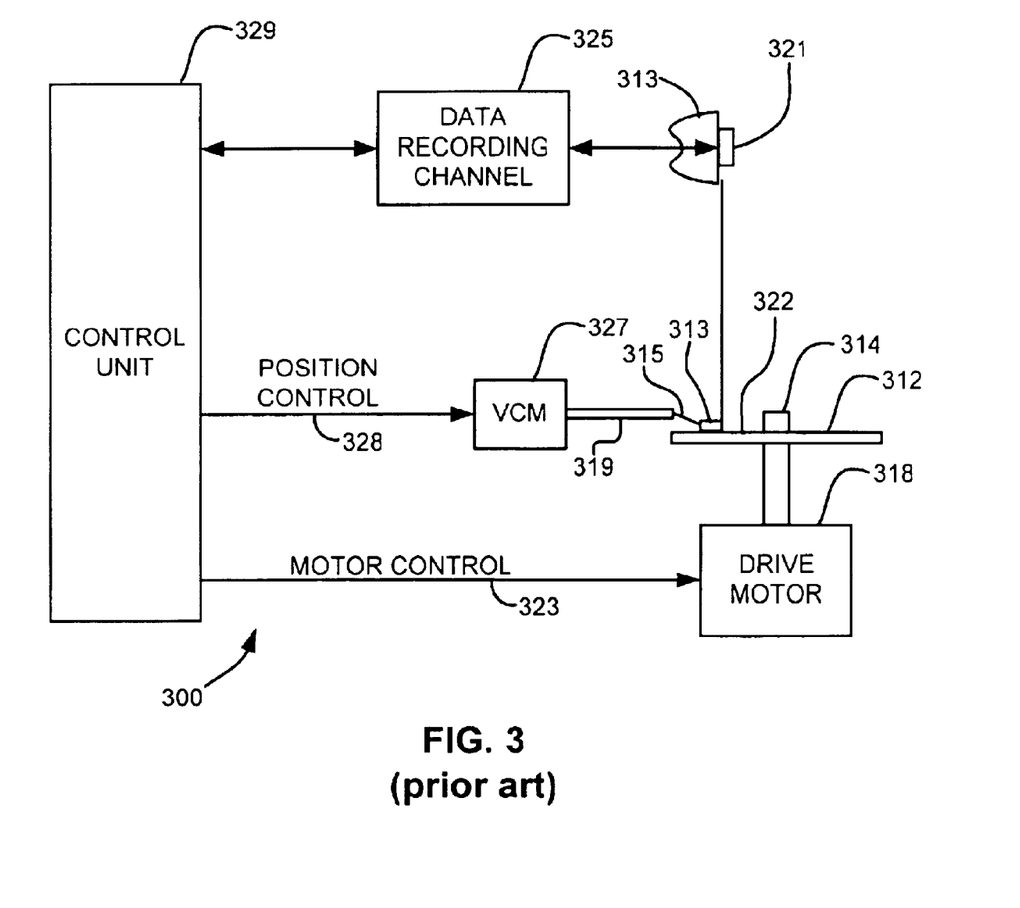
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. As the disks rotate, slider 313 is moved radially in and out over disk surface 322 so that heads 321 may access different tracks of the disk where desired data are recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
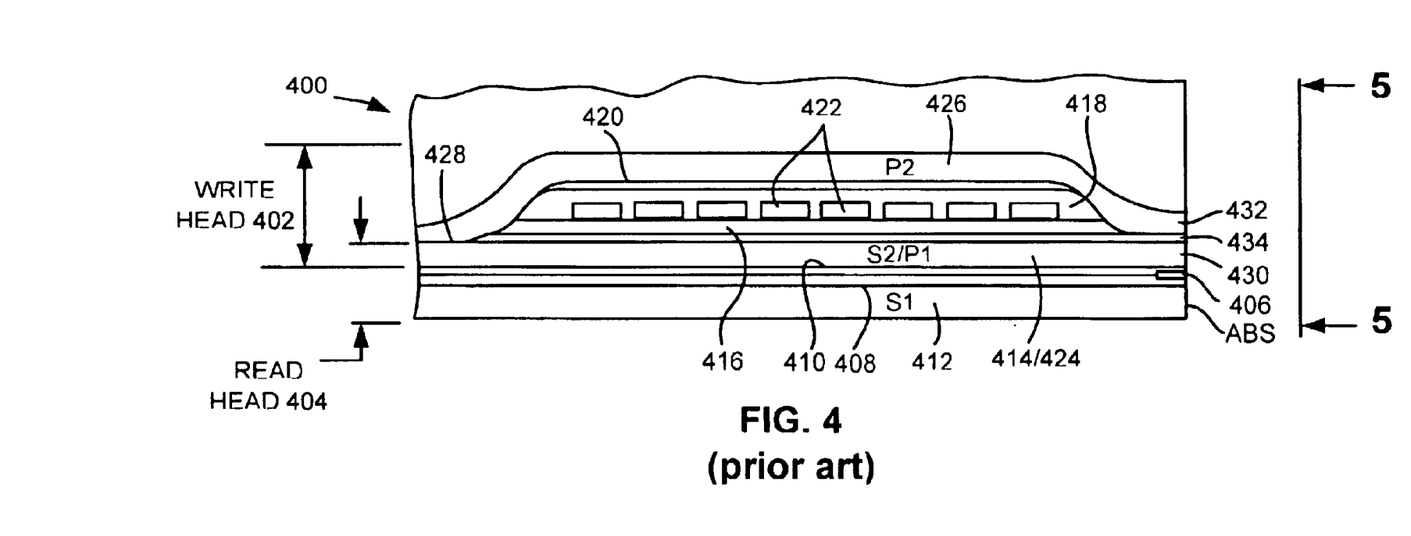
FIG. 4 is a partial view of the slider and a merged magnetic head.
Figure 5:
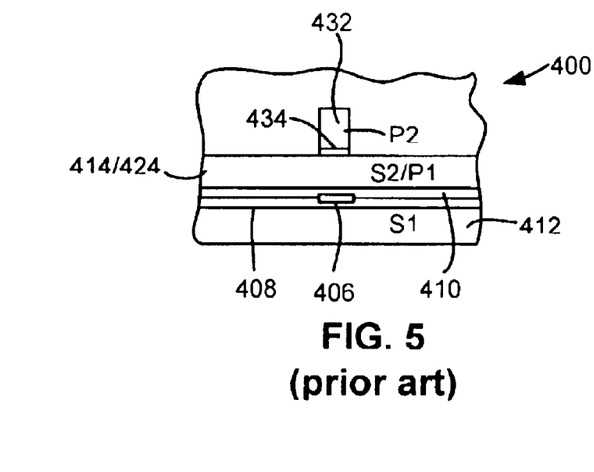
FIG. 5 is a partial ABS view, not to scale, of the slider taken along plane 5—5 of FIG. 4 to show the read and write elements of the merged magnetic head.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
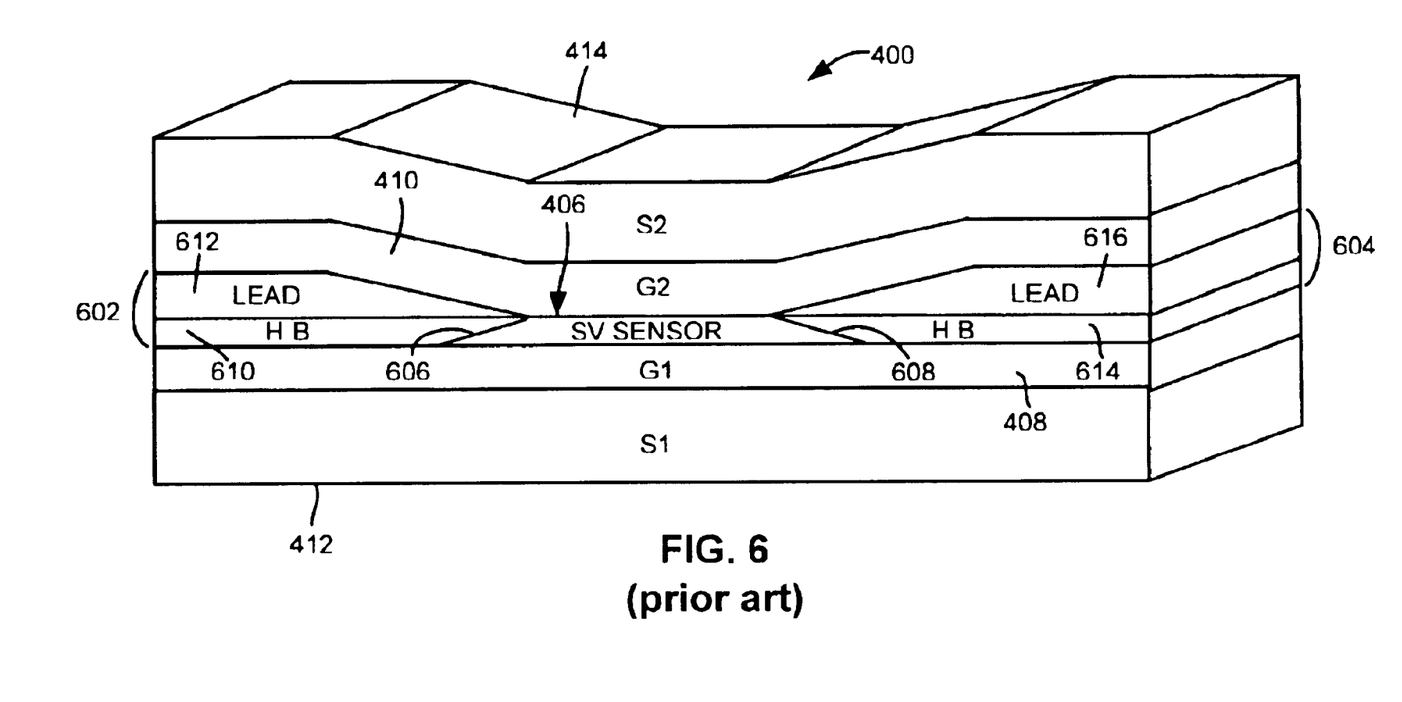
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides a new sensor structure in which particular layers of a free layer structure are pinned antiparallel to each other and extend beyond the track width of the sensor. A third layer is added to the free layer structure in the track width to increase the net magnetic thickness of the free layer structure. This novel structure has been found to increase both the stability of the free layer structure and improve track definition by reducing the effect of magnetic influences of side tracks. Many types of heads can use the structure described herein, and the structure is particularly adapted to CPP GMR sensors and CPP tunnel valve sensors. In the following description, the track edges of the layers are defined by the track width (W). The sensor height is in a direction into the face of the paper in an ABS view. Unless otherwise described, thicknesses of the individual layers are taken perpendicular to the plane of the associated layer and are provided by way of example only and may be larger and/or smaller than those listed. Similarly, the materials listed herein are provided by way of example only, and one skilled in the art will understand that other materials may be used without straying from the spirit and scope of the present invention. Also, the processes used to form the structures are conventional.

CPP GMR

Figure 7:
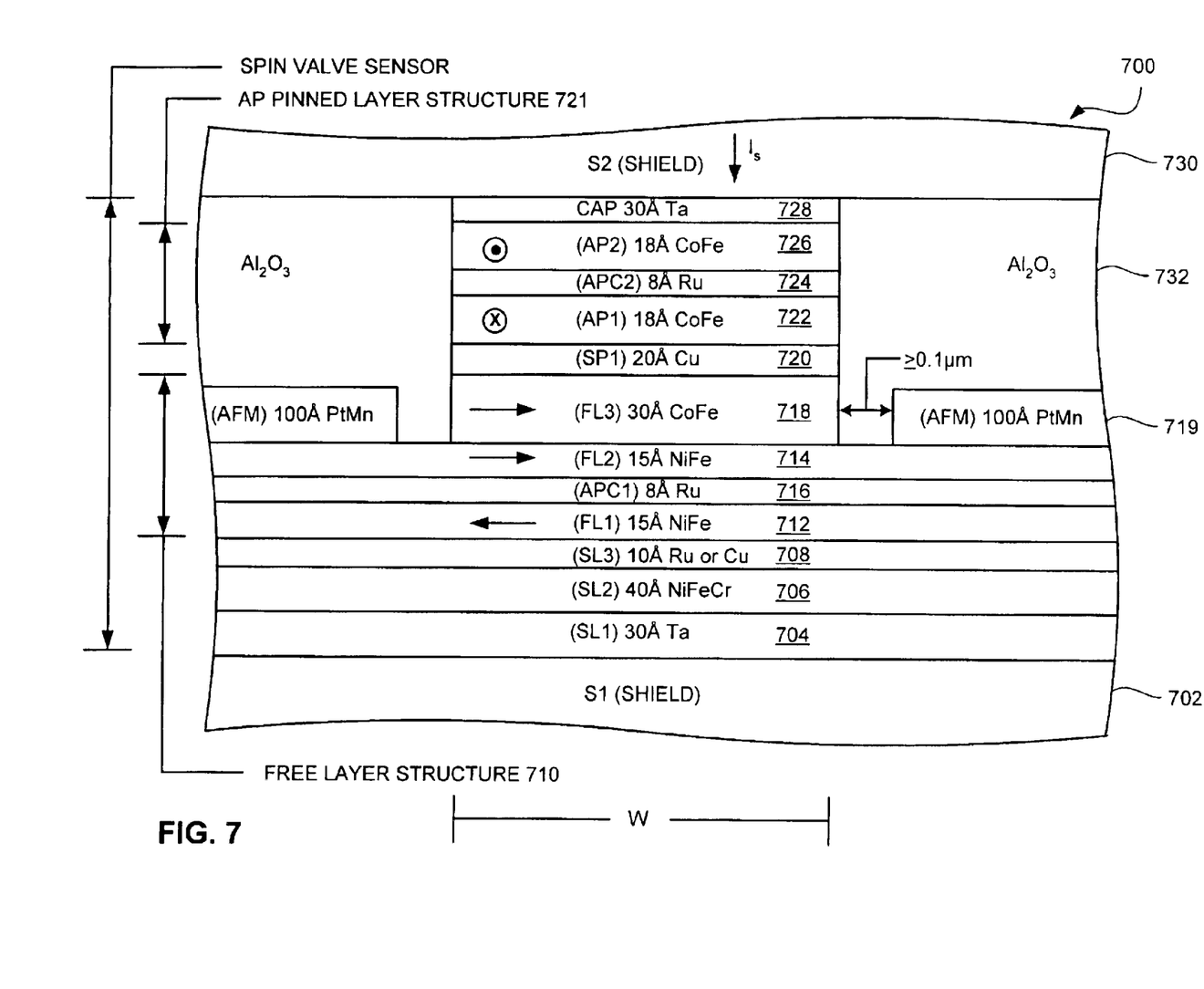
FIG. 7 is an ABS illustration of a CPP GMR sensor, not to scale, according to an embodiment of the present invention.

FIG. 7 depicts an ABS view of a CPP GMR sensor 700 according to one embodiment. "CPP" means that the sensing current ($I_s$) flows from one shield to the other shield in a direction perpendicular to the plane of the layers forming the sensor 700.

As shown in FIG. 7, a first shield layer (S1) 702 is formed on a substrate (not shown). The first shield layer 702 can be of any suitable material, such as permalloy (NiFe). An illustrative thickness of the first shield layer is in the range of about 0.5 to about 2 μm.

Seed layers are formed on the first shield layer 702. The seed layers aid in creating the proper growth structure of the layers above them. Illustrative materials formed in a stack from the first shield layer 702 are a layer (SL1) 704 of Ta, a layer (SL2) 706 of NiFeCr, and a layer (SL3) 708 of either Ru or Cu. Illustrative thicknesses of these materials are Ta (30 Å), NiFeCr (40 Å), and Ru or Cu (10 Å). Note that the stack of seed layers can be varied, and layers may be added or omitted based on the desired processing parameters.

Then a free layer structure 710 is formed above the seed layers. The magnetic orientation of the free layer structure 710 must be preset during manufacture, otherwise the orientation will be unstable and could move around at random, resulting in a "scrambled" or noisy signal. This instability is a fundamental property of magnetically soft materials, making them susceptible to any external magnetic perturbations. Thus, the magnetic orientation of the active area of the free layer structure 710 should be stabilized so that when its magnetic orientation moves, it consistently moves around in a systematical manner rather than a random manner. The magnetic orientation of the active portion of the free layer structure 710 should also be stabilized so that it is less susceptible to reorientation, i.e., reversing. The structure disclosed stabilizes the free layer structure 710.

As shown, the free layer structure 710 has first, second, and third magnetic layers (FL1), (FL2), (FL3) 712, 714, 718, respectively. The first and second layers 712, 714 extend beyond the track width W and are separated by a thin layer of antiparallel coupling material (APC1) 716. The antiparallel coupling layer 716 causes the magnetic orientations of the first and second layers 712, 714 in the free layer structure 710 to be oriented antiparallel to each other. The third layer 718 is about as wide as the track width W. In the central portion defined by the track width W, the second and third layers 714, 718 are ferromagnetically exchange coupled parallel to each other. The resulting free layer structure 710 can be called a synthetic antiparallel coupled free layer structure.

Preferably the first and second layers 712, 714 have about the same magnetic thickness. In the end regions, defined as outside the track width W, the magnetic orientations of the first and second layers 712, 714 are strongly pinned and are therefore unaffected by external magnetic forces, such as those created by adjacent tracks on a magnetic media passing thereby. However, the net magnetic thickness of the second and third layers 714, 718 in the central portion (in the track width W) is larger than the thickness of the first layer 712. The larger net magnetic moment of the second and third layers 714, 718 allows the free layer structure 710 to create signal variations when acted upon by external magnetic forces such as those created by magnetic media passing thereby.

For manufacturing ease, the first and second layers can be made very wide relative to the track width W, which is currently less than about 0.1 μm. As a minimum, the portions of the first and second layers 712, 714 outside the track edges are each at least about as wide as the track width W. Preferably, the total length of first and second layers is about five times the track width W or more.

Because the net thickness of the second and third layers 714, 718 can be adjusted by varying the thickness of the third layer 718, the free layer structure 710 so can be designed to any desired magnetic thickness. For example, suppose a free layer magnetic thickness of 30 Å is desired, and the first and second layers 712, 714 are each 15 Å thick. Because the first and second layers 712, 714 have about the same magnetic thickness and are AP coupled, the third layer thickness is formed to 30 Å. Thus, the thickness of the first layer 712 is 15 Å, and the total thickness of the second and third layers 714, 718 is 45 Å, and the net magnetic thickness of the free layer structure 710 is 30 Å.

Because the pinning strength of the first and second layers 712, 714 becomes weaker as the width of the layers is decreased, the magnetic orientations of the first and second layers 712, 714 tend to become unpinned under electrical/mechanical stress. To overcome this tendency to flip, the first and second layers 712, 714 are made wider than the track width W. This is permissible because the first and second layers 712, 714 do not affect the effective track width W of the sensor 700.

As the portions of the first and second layers 712, 714 in the track width W try to flip under electrical/mechanical stress, the areas of the first and second layers 712, 714 outside the track edges of the sensor prevents the magnetic orientations of the first and second layers 712, 714 from flipping. Because the first and second layers 712, 714 are longer, the first and second layers 712, 714 have higher magnetic stability from the shape anisotropy. The width W of the sensor is very long compared to its height (into the page), this provides larger magnetic anisotropy for stability. The second layer 714 in turn stabilizes the third layer 718 via the ferromagnetic exchange coupling.

Illustrative materials for the first, second and third layers 712, 714, 718 are NiFe, $CoFe_{10}$ (90% Co, 10% Fe), $CoFe_{50}$ (50% Co, 50% Fe), etc. Illustrative thicknesses of the first and second layers 712, 714 are between about 10 Å and 30 Å. An illustrative thickness of the third layer 718 is between about 10 and 50 Å. The Ru layer 716 can be about 5–15 Å, but is preferably selected to provide a saturation field above about 10 KOe. In a preferred embodiment, each of the pinned first and second layers 712, 714 is about 15 Å with an Ru layer 716 therebetween of about 8 Å.

Several benefits of the synthetic free layer structure 710 described herein are achieved over known sensor structures. Because the outside portions of the first and second layers 712, 714 have near identical magnetic thicknesses, they do not generate any signal. Thus, track definition is better because, as the outside portions of the first and second layers 712, 714 do not generate any signal, side reading is reduced or eliminated. The pinning of the first and second layers 712, 714 also stabilizes the free layer such that no in-stack bias layer or peripheral hard bias layer is necessary. Further, the total magnetic thickness of the free layer structure 710 can be made much larger. In addition, the free layer structure 710 is much more magnetically stable at high temperatures.

In addition to the improvement provided by the longer pinned first and second layers 712, 714, outer portions of first and second layers 712, 714 can be pinned by an antiferromagnetic layer (AFM) 719. The pinning by the AFM layer 719 creates interlayer exchange coupling that carries over to the portions of the first and second layers 712, 714 positioned within the track width. In particular, the first and second layers 712, 714 are exchange coupled with each other, the portions of the pinned layers first and second layers 712, 714 inside the track width are exchange coupled with the portions of the first and second layers 712, 714 outside the track width, and the portions of the first and second layers 712, 714 outside the track width are exchange coupled with the AFM layer 719. Thus, the effects of the AFM layer 719 travel throughout the first and second layers 712, 714. The zero net moment of the free layer structure 710 coupled with the additional pinning by the AFM layer 719 assures strong pinning. In fact, the first and second layers 712, 714 are pinned so strongly that virtually no external magnetic or electrical force will be able to disrupt the magnetic orientations of the first and second layers 712, 714.

The AFM layer 719 is spaced apart from the portions of the sensor 700 within the track width because otherwise the AFM layer 719 would shunt current. Preferably, the space between the AFM layer 719 and the track edges of the sensor is about 0.1 micron or more. The gap can be smaller, but it will reduce free layer sensitivity. The effects of the AFM layer 719 are enhanced because the AFM layer 719 is positioned outside the track width, and therefore stays cooler because no current flows though it. This design provides a further advantage in that because the AFM layer 719 is not positioned in the sensor stack, thus reducing the gap of the sensor. Preferred materials for the AFM layer 719 are PtMn, IrMn, etc. The thickness of the AFM layer 719 can be about 60–150 Å if it is constructed from PtMn, and about 30–80 Å if it is constructed from IrMn, regardless of the thicknesses of the first and second layers 712, 714. The thickness of the AFM layer 719 is may be varied because the net moment of the pinned layer structure 710 is about zero.

A first spacer layer (SP1) 720 is formed above the free layer structure 710. Illustrative materials for the first spacer layer 720 include Cu, $CuO_x$, $Cu/CoFeO_x/Cu$ stack, etc. The first spacer layer 720 can be about 10–40 Å thick, preferably about 30 Å.

Then an antiparallel (AP) pinned layer structure 721 is formed above the first spacer layer 720. As shown in FIG. 7, first and second AP pinned magnetic layers, (AP1) and (AP2) 722, 726, are separated by a thin layer of an antiparallel coupling material (APC2) 724 such that the magnetic moments of the AP pinned layers 722, 726 are self-pinned antiparallel to each other. The pinned layers 722, 726 have a property known as magnetostriction. The magnetostriction of the pinned layers 722, 726 is very positive. The sensor 700 is also under compressive stresses because of its geometry at the ABS, and the configuration of the layer is such that it produces very large compressive stress. The combination of high positive magnetostriction and compressive stress causes the pinned layers 722, 726 to develop a magnetic anisotropy that is in a perpendicular direction to the track width. This magnetic coupling through the Ru spacer causes the pinned layers 722, 726 to have antiparallel-oriented magnetizations.

In the embodiment shown in FIG. 7, the preferred magnetic orientation of the pinned layers 722, 726 is for the first pinned layer 722, into the face of the structure depicted (perpendicular to the ABS of the sensor 700), and out of the face for the second pinned layer 726. Illustrative materials for the pinned layers 722, 726 are $CoFe_{10}$ (90% Co, 10% Fe), $CoFe_{50}$ (50% Co, 50% Fe), etc. separated by a Ru layer 724. Illustrative thicknesses of the first and second pinned layers 722, 726 are between about 10 Å and 25 Å. The Ru layer 724 can be about 5–15 Å, but is preferably selected to provide a saturation fields above about 10 KOe. In a preferred embodiment, each of the pinned layers 722, 726 is about 18 Å with an Ru layer 724 therebetween of about 8 Å.

A cap (CAP) 728 is formed above the bias layer 726. Exemplary materials for the cap 728 are Ta, Ta/Ru stack, etc. An illustrative thickness of the cap 728 is 20–30 Å.

A second shield layer (S2) 730 is formed above the cap 728. An insulative material 732 such as $Al_2O_3$ is formed on both sides of the sensor stack.

Figure 8:
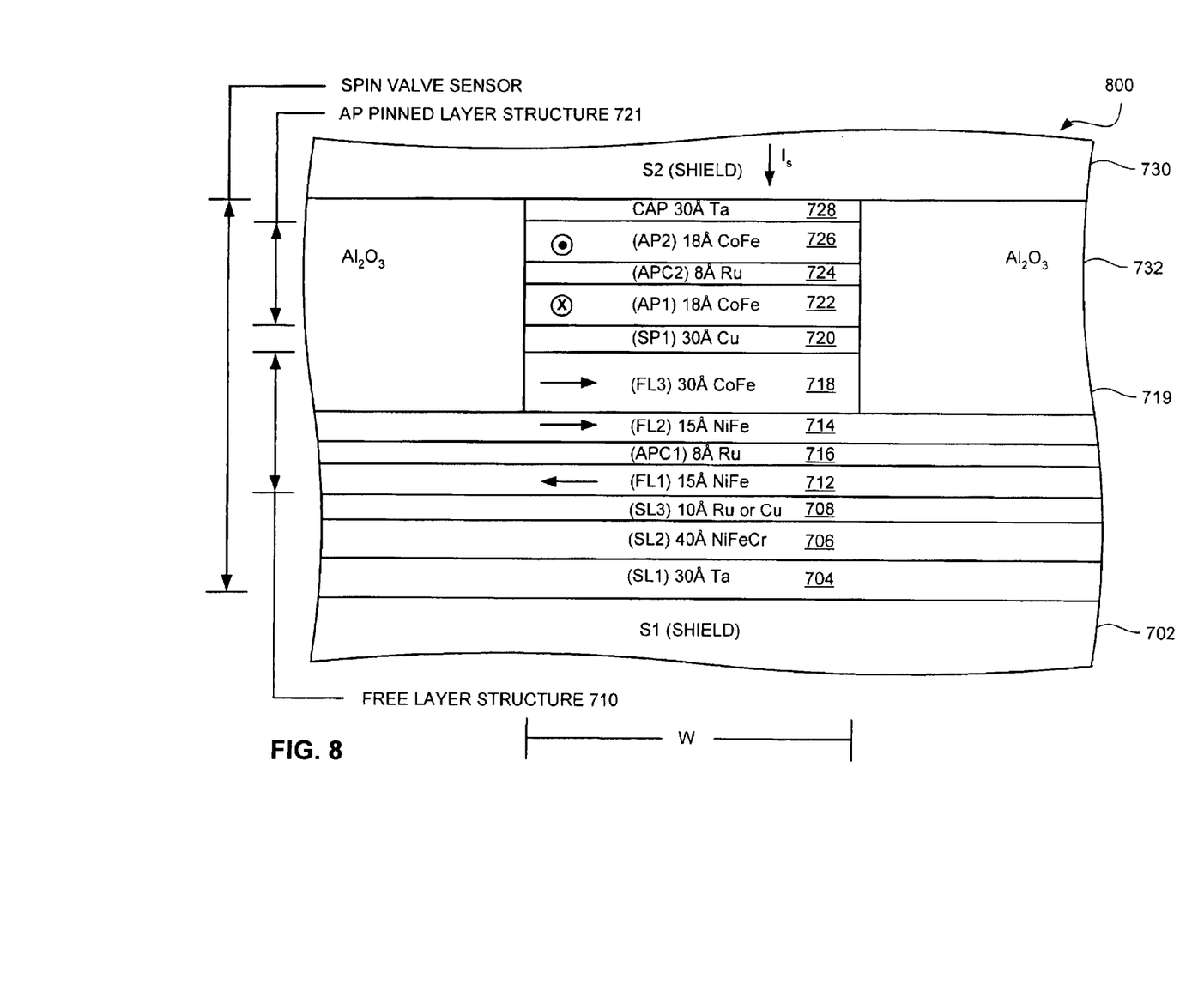
FIG. 8 is an ABS illustration of a CPP GMR sensor, not to scale, according to another embodiment of the present invention.

FIG. 8 depicts an ABS view of a CPP GMR sensor 800 according to another embodiment. The CPP GMR sensor 800 generally has the same configuration as the structure shown in FIG. 7, except that the AFM layer 719 has been removed. The end regions of the first and second layers 712, 714 will not generate any signal if the magnetic thicknesses of the first and second layers 712, 714 are substantially matched, as the end regions are self-pinned.

However, the AFM layer 719 enhances the pinning of the end regions of the first and second layers 712, 714, and thus the magnetic stability of the first and second layers 712, 714, and so is preferred.

Figure 9:
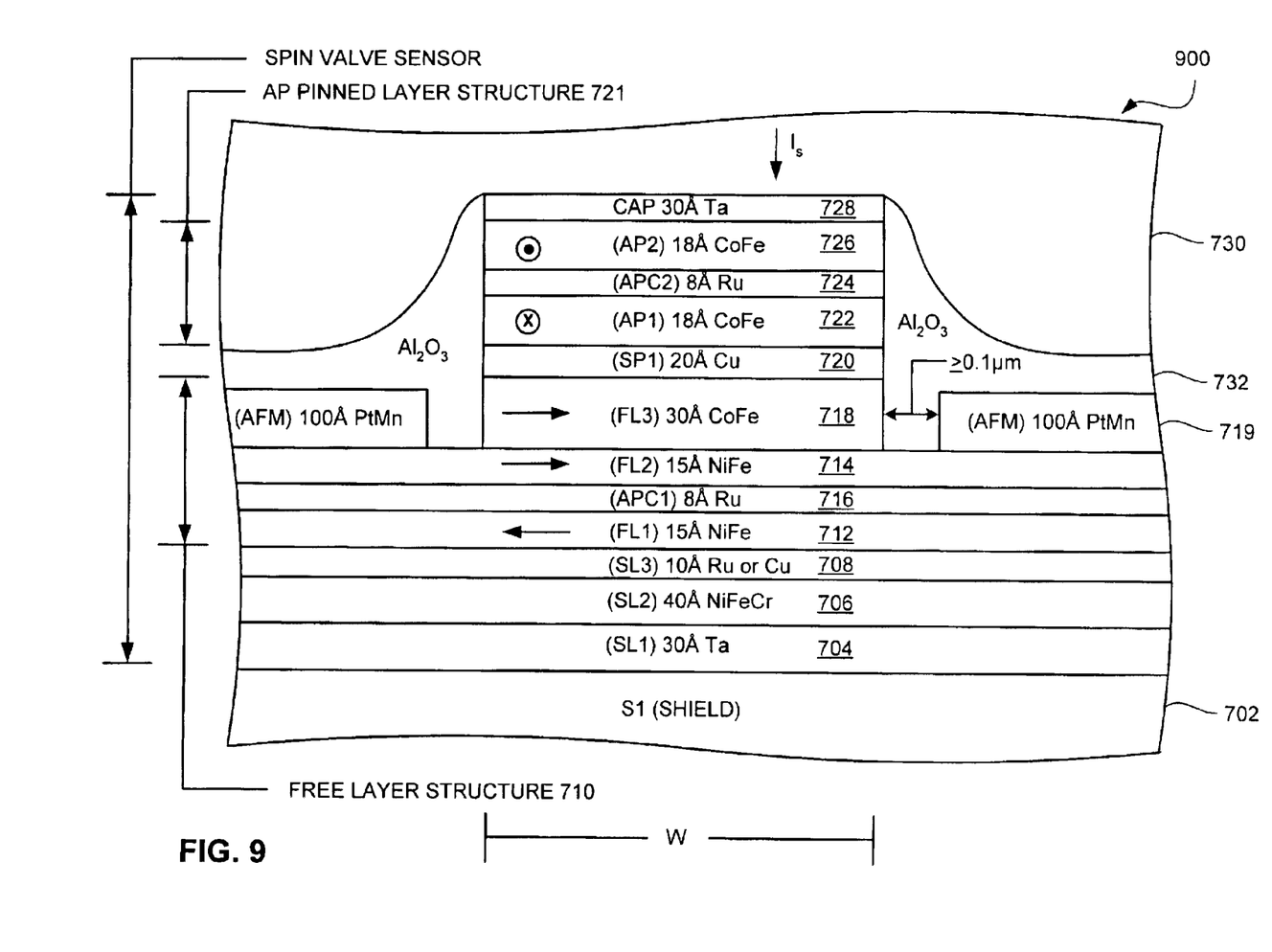
FIG. 9 is an ABS illustration of a CPP GMR sensor, not to scale, according to an alternate embodiment of the present invention.

FIG. 9 depicts an ABS view of a CPP GMR sensor 900 according to another embodiment. The CPP GMR sensor 900 generally has the same configuration as the structure shown in FIG. 7, except that the second shield layer 730 extends downwardly so that it is positioned along a portion of the sensor stack. This design provides better track resolution, because the second shield layer 730 is closer to the free layer structure 710. Magnetic fields from adjacent tracks are drawn to the second shield layer 730, and therefore do not interfere with the reading function.

CPP Tunnel Valve

Figure 10:
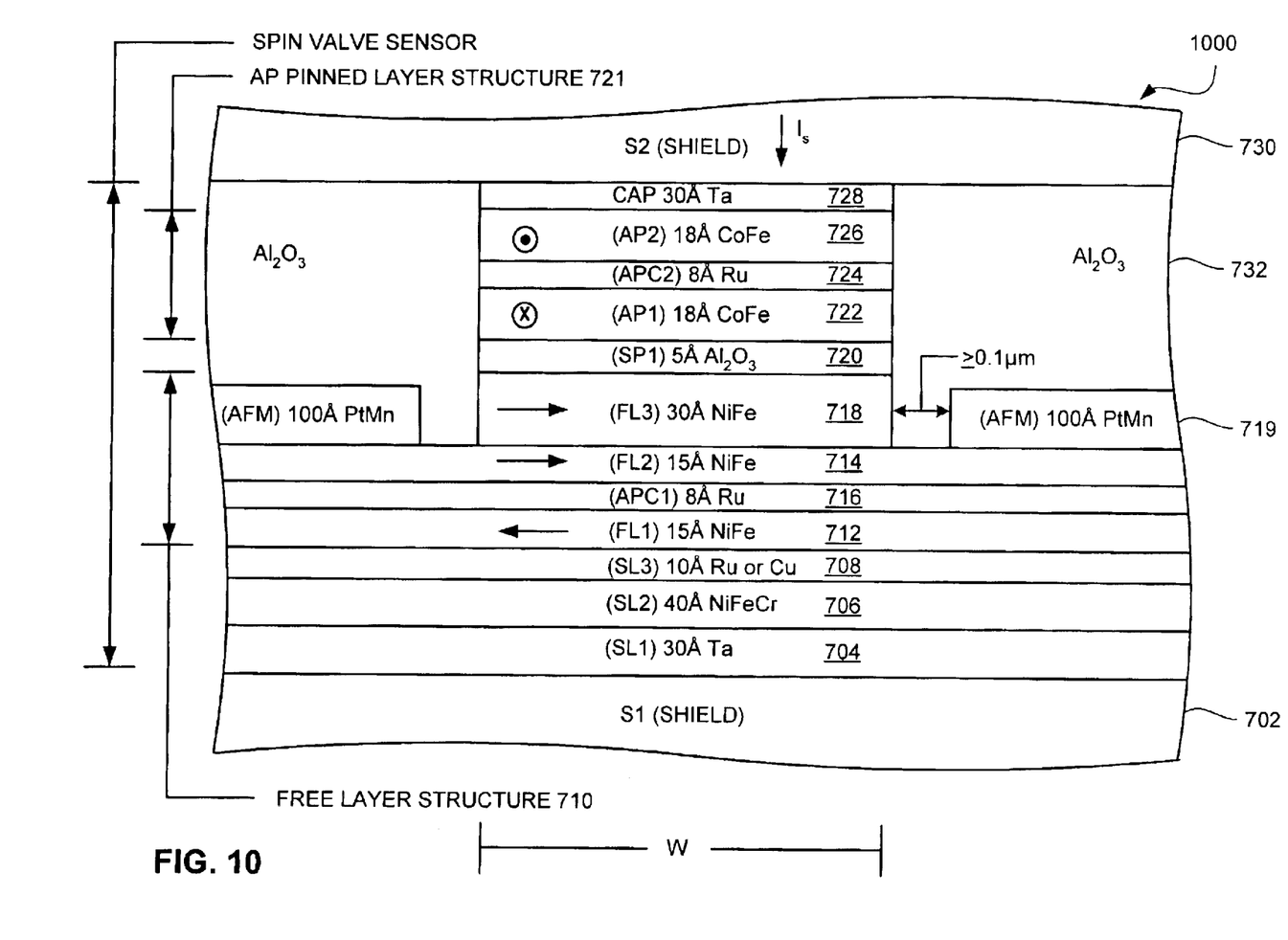
FIG. 10 is an ABS illustration of a CPP tunnel valve sensor, not to scale, according to an embodiment of the present invention.

FIG. 10 depicts an ABS view of a CPP tunnel valve sensor 1000 according to one embodiment. The CPP tunnel valve sensor 1000 generally has the same configuration as the structure shown in FIG. 7, except that the first spacer layer 720 is formed of a dielectric barrier material, such as, $Al_2O_3$, $AlO_x$, $MgO_x$, etc. The first spacer layer 720 is very thin such that the electric current passing through the sensor 1000 "tunnels" through the first spacer layer 720. An illustrative thickness of the first spacer layer 720 is 3–6 Å.

CIP GMR

The concepts described above can also be adapted to create a CIP GMR sensor, as will be apparent to those skilled in the art. "CIP" means that the sensing current ($I_s$) flows from in a direction parallel to or "in" the plane of the layers forming the sensor. The CIP GMR sensor generally has the same configuration as the structures shown in FIGS. 7–10, except that leads of conventional materials and thicknesses are formed on opposite sides of the sensor and the sensor is sandwiched between an insulative material rather than shields.

In one method to fabricate the sensors shown in FIGS. 7–10, the layers 702–728 (except the AFM layer 719) are formed. A resist mask is formed on the cap layer 728 to cover and define the track width W. The structure is etched or milled down to second layer 714. If an AFM layer 719, is to be added, it is formed on the second layer 714. The structure areas outside the track edges are then filled with $Al_2O_3$ 732. The structure is planarized via chemical-mechanical polishing (CMP). Then the second shield layer 730 is formed.

Another method to fabricate the sensors shown in FIGS. 7–10 is to form layers 702–714. A resist mask is formed outside the desired track edges, leaving the track width W exposed. The remaining layers 718–728 are formed in the track width W defined between the mask edges. The resist is removed. If an AFM layer 719, is to be added, it is formed on the second layer 714. The structure areas outside the track edges are then filled with $Al_2O_3$ 732. The structure is planarized via chemical-mechanical polishing (CMP). Then the second shield layer 730 is formed.

While various embodiments have been described above, it should be understood that they have been presented by way of example only, and not limitation. For example, the structures and methodologies presented herein are generic in their application to all MR heads, AMR heads, GMR heads, TMR heads, CPP GMR heads, etc. Thus, the breadth and scope of a preferred embodiment should not be limited by any of the above-described exemplary embodiments, but should be defined only in accordance with the following claims and their equivalents.

What is claimed is:

1. A magnetic head having an air bearing surface (ABS), comprising:
   a free layer structure, comprising:
      a first free layer having a magnetic moment;
      a second free layer having a magnetic moment pinned antiparallel to the magnetic moment of the first free layer; and
      a third free layer having a magnetic moment oriented parallel to the magnetic moment of the second free layer;
   wherein ends of the third free layer define track edges of the third free layer;
   wherein the first and second free layers extend beyond the track edges in a direction parallel to the ABS for distances each at least as long as a length of the third free layer measured between the track edges thereof,
   wherein portions of the first and second free layers that extend beyond the track edges are pinned antiparallel to each other.

2. A magnetic head having an air bearing surface (ABS), comprising:
   a free layer structure, comprising:
      a first free layer having a magnetic moment;
      a second free layer having a magnetic moment pinned antiparallel to the magnetic moment of the first free layer; and
      a third free layer having a magnetic moment oriented parallel to the magnetic moment of the second free layer;
   wherein ends of the third free layer define track edges of the third free layer;
   wherein the first and second free layers extend beyond the track edges in a direction parallel to the ABS,
   wherein a net magnetic moment of the first and second free layers is about zero.

3. A head as recited in claim 2, wherein the first and second free layers extend beyond the track edges for distances each at least as long as a length of the third free layer measured between the track edges thereof.

4. A head as recited in claim 3, wherein the first and second free layers extend beyond the track edges for distances each at least five times as long as a length of the third free layer.

5. A head as recited in claim 2, wherein a thickness of the first free layer is less than a combined thickness of the second and third free layers, the thicknesses being measured in a direction perpendicular to a plane of the first free layer.

6. A head as recited in claim 2, wherein a thickness of the third free layer is greater than thicknesses of the first and second free layers individually, the thicknesses being measured in a direction perpendicular to a plane of the first free layer.

7. A head as recited in claim 2, further comprising at least one antiferromagnetic (AFM) layer positioned outside the track edges of the third free layer in a direction parallel to the ABS, each AFM layer being for pinning a magnetic orientation of portions of the free layer closest thereto and positioned outside the track edges of the third layer.

8. A head as recited in claim 2, further comprising an antiparallel (AP) pinned layer structure having at least two pinned layers having magnetic moments that are self-pinned antiparallel to each other.

9. A magnetic storage system, comprising:
   magnetic media;
   at least one head for reading from and writing to the magnetic media, each head having:
      a sensor having the structure recited in claim 2;
      a write element coupled to the sensor;
   a slider for supporting the head; and
   a control unit coupled to the head for controlling operation of the head.

10. A magnetic head having an air bearing surface (ABS), comprising:
    a free layer structure, comprising:
       a first free layer having a magnetic moment;
       a second free layer having a magnetic moment pinned antiparallel to the magnetic moment of the first free layer; and
       a third free layer having a magnetic moment oriented parallel to the magnetic moment of the second free layer;
    wherein ends of the third free layer define track edges of the third free layer;
    wherein the first and second free layers extend beyond the track edges in a direction parallel to the ABS, and
    a shield layer positioned above the free layer structure, portions of the shield layer positioned outside the track edges extending downwardly towards the portions of the free layer structure positioned outside the track edges.

11. A head as recited in claim 2, wherein the head forms part of a CPP GMR sensor.

12. A head as recited in claim 2, wherein the head forms part of a CIP GMR sensor.

13. A head as recited in claim 2, wherein the head forms part of a tunnel valve sensor.

14. A magnetic head having an air bearing surface (ABS), comprising:
    an antiparallel (AP) pinned layer structure having at least two pinned layers with magnetic moments that are self-pinned antiparallel to each other, the pinned layers being separated by an AP coupling layer; and
    a free layer structure spaced apart from the AP pinned layer structure, the free layer structure comprising:
       a first free layer having a magnetic moment;
       a second free layer having a magnetic moment pinned antiparallel to the magnetic moment of the first free layer; and
       a third free layer having a magnetic moment oriented parallel to the magnetic moment of the second free layer;
    wherein ends of the third free layer define track edges of the third free layer;
    wherein the first and second free layers extend beyond the track edges in a direction parallel to the ABS for distances each at least as long as a length of the third free layer measured between the track edges thereof;
    wherein a thickness of the first free layer is less than a combined thickness of the second and third free layers, the thicknesses being measured in a direction perpendicular to a plane of the first free layer.

15. A magnetic head having an air bearing surface (ABS), comprising:

an antiparallel (AP) pinned layer structure having at least two pinned layers with magnetic moments that are self-pinned antiparallel to each other, the pinned layers being separated by an AP coupling layer; and a free layer structure spaced apart from the AP pinned layer structure, the free layer structure comprising:
   a first free layer having a magnetic moment;
   a second free layer having a magnetic moment pinned antiparallel to the magnetic moment of the first free layer; and
   a third free layer having a magnetic moment oriented parallel to the magnetic moment of the second free layer;

wherein ends of the third free layer define track edges of the third free layer;

wherein the first and second free layers extend beyond the track edges in a direction parallel to the ABS for distances each at least as lone as a length of the third free layer measured between the track edges thereof;

wherein a thickness of the first free layer is less than a combined thickness of the second and third free layers, the thicknesses being measured in a direction perpendicular to a plane of the first free layer, wherein a net magnetic moment of the first and second free layers is about zero.

16. A head as recited in claim 15, wherein the first and second free layers extend beyond the track edges for distances each at least five times as long as a length of the third free layer.

17. A head as recited in claim 15, wherein a thickness of the third free layer is greater than thicknesses of the first and second free layers individually, the thicknesses being measured in a direction perpendicular to a plane of the first free layer.

18. A head as recited in claim 15, further comprising at least one antiferromagnetic (AFM) layer positioned outside the track edges of the third free layer in a direction parallel to the ABS, each AFM layer being for pinning a magnetic orientation of portions of the free layer closest thereto and positioned outside the track edges of the third layer.

19. A magnetic head having an air bearing surface (ABS), comprising:

an antiparallel (AP) pinned layer structure having at least two pinned layers with magnetic moments that are self-pinned antiparallel to each other, the pinned layers being separated by an AP coupling layer; and a free layer structure spaced apart from the AP pinned layer structure, the free layer structure comprising:
   a first free layer having a magnetic moment;
   a second free layer having a magnetic moment pinned antiparallel to the magnetic moment of the first free layer; and
   a third free layer having a magnetic moment oriented parallel to the magnetic moment of the second free layer;

wherein ends of the third free layer define track edges of the third free layer;

wherein the first and second free layers extend beyond the track edges in a direction parallel to the ABS for distances each at least as long as a length of the third free layer measured between the track edges thereof;

wherein a thickness of the first free layer is less than a combined thickness of the second and third free layers, the thicknesses being measured in a direction perpendicular to a plane of the first free layer, and a shield layer positioned above the free layer structure, portions of the shield layer positioned outside the track edges extending downwardly towards the portions of the free layer structure positioned outside the track edges.

20. A head as recited in claim 15, wherein the head forms part of a CPP GMR sensor.

21. A head as recited in claim 15, wherein the head forms part of a CIP GMR sensor.

22. A head as recited in claim 15, wherein the head forms part of a tunnel valve sensor.

* * * * *

UNITED STATES PATENT AND TRADEMARK OFFICE
CERTIFICATE OF CORRECTION

PATENT NO. : 6,943,997 B2  
DATED : September 13, 2005  
INVENTOR(S) : Gill

It is certified that error appears in the above-identified patent and that said Letters Patent is hereby corrected as shown below:

Column 8,
Line 18, change "lone" to -- long --.

Signed and Sealed this

Twenty-ninth Day of November, 2005

JON W. DUDAS
*Director of the United States Patent and Trademark Office*